United States Patent
Creswell et al.

(10) Patent No.: US 7,450,927 B1
(45) Date of Patent: Nov. 11, 2008

(54) INTERACTIVE COMMUNICATION SERVICE ACCOUNT MANAGEMENT SYSTEM

(75) Inventors: Carroll W. Creswell, Basking Ridge, NJ (US); Jeffrey J. Farah, North Brunswick, NJ (US); Gregg A. Toney, Chester, NJ (US)

(73) Assignee: AT&T Corp., New York, NY (US)

( * ) Notice: Subject to any disclaimer, the term of this patent is extended or adjusted under 35 U.S.C. 154(b) by 925 days.

(21) Appl. No.: 10/052,814

(22) Filed: Jan. 23, 2002

(51) Int. Cl.
 *H04M 11/00* (2006.01)
(52) U.S. Cl. .................. 455/405; 455/406; 455/410
(58) Field of Classification Search .............. 455/405, 455/406, 408, 414.1, 452.1, 452.2, 517, 432.3, 455/428, 433, 461, 557, 632.3
 See application file for complete search history.

(56) References Cited

U.S. PATENT DOCUMENTS

| | | | |
|---|---|---|---|
| 4,260,855 A | 4/1981 | Rubinstein | 379/140 |
| 4,404,433 A | 9/1983 | Wheeler et al. | 379/111 |
| 4,656,657 A | 4/1987 | Hunsicker | 379/140 |
| 4,751,728 A | 6/1988 | Treat | 379/114.01 |
| 4,788,719 A | 11/1988 | Gupta | 379/115.01 |
| 4,888,822 A | 12/1989 | Weinberger et al. | 379/130 |
| 5,425,087 A | 6/1995 | Gerber et al. | 379/134 |
| 5,896,445 A | 4/1999 | Kay et al. | 379/135 |
| 5,937,045 A | 8/1999 | Yaoya et al. | 379/130 |
| 5,943,406 A | 8/1999 | Leta et al. | 379/120 |
| 6,137,872 A * | 10/2000 | Davitt et al. | 379/114.2 |
| 6,188,752 B1 * | 2/2001 | Lesley | 379/114.16 |
| 6,333,976 B2 * | 12/2001 | Lesley | 379/114.01 |
| 6,373,930 B1 * | 4/2002 | McConnell et al. | 379/114.28 |
| 6,376,930 B1 * | 4/2002 | Nagao et al. | 307/10.2 |
| 6,628,934 B2 * | 9/2003 | Rosenberg et al. | 455/406 |
| 2001/0001321 A1 * | 5/2001 | Resnick et al. | 705/17 |
| 2002/0055878 A1 * | 5/2002 | Burton et al. | 705/26 |
| 2003/0101135 A1 * | 5/2003 | Myatt et al. | 705/40 |

FOREIGN PATENT DOCUMENTS

CA 2216762 9/1998

(Continued)

OTHER PUBLICATIONS

Internet Press Release "Verizon Wireless to Introduce Over-The-Air Voice and Data Service Provisioning," http://www.openwave.com/newsroom/2001/20010125_0125.html (printed Oct. 8, 2001).

(Continued)

*Primary Examiner*—Lester Kincaid
*Assistant Examiner*—Dai A Phuong

(57) ABSTRACT

A system and method permit a customer obtaining communication services to modify account parameters governing terms on which that service is provided. Customer account parameters are stored in one or more databases and accessed by one or more servers. The customer, upon accessing the communication service, is provided with an opportunity to modify the account parameters via automated interactive communication with the server. The invention can applied to wireless communication services such as wireless telephone service, wireless internet access, paging, or other forms of interactive wireless communication; to telephone or other wired interactive communication; to cable services; and to any other form of interactive subscriber communications. The invention may be implemented using existing equipment, and can be optimized for the type of communication device at issue.

14 Claims, 3 Drawing Sheets

FOREIGN PATENT DOCUMENTS

| | | | |
|---|---|---|---|
| EP | 0 863 678 | * | 9/1998 |
| WO | WO 97/21299 A1 | | 6/1997 |

OTHER PUBLICATIONS

Verizon Wireless—Plans and Pricing: Promotional Family SharePlan<sup>SM</sup> Plan, Service for Washington, DC htp://www.verizonwireless.com/ics/plsql/plan_detail.intro?p_hdr_id=26892247&p_plan_c... (printed Oct. 8, 2001).

Verizon Wireless—Plans and Pricing: Family SharePlan<sup>SM</sup> Plan, Service for Washington, DC htp://www.verizonwireless.com/ics/plsql/plan_detail.intro?p_hdr_id=26892247&p_plan_c... (printed Oct. 8, 2001).

Verizon Wireless—Shop Online: Choose Your [FREEUP] Prepay Service, Service for Washington, DC http://www.verizonwireless.com/ics/plsqlprepay.intro (printed Oct. 8, 2001).

Verizon Wireless—Shop Online: Refill Your [FREE/UP] Prepay Account, http://www.verizonwireless.com/ics/plsq/refill.intro (printed Oct. 8, 2001).

Verizon Wireless Customer Service, http://www.verizonwireless.com/are/index_a.html (printed Oct. 8, 2001).

Welcome to Verizon Wireless, http://www.verizonwireless.com/ics/plsql/trl.popup?p_typea=LEGAL&p_package_id=5032 (printed Oct. 8, 2001).

U. Schoen et al., "Convergence Between Public Switching and the Internet," IEEE Comm. pp. 50-65, Jan. 1998.

* cited by examiner

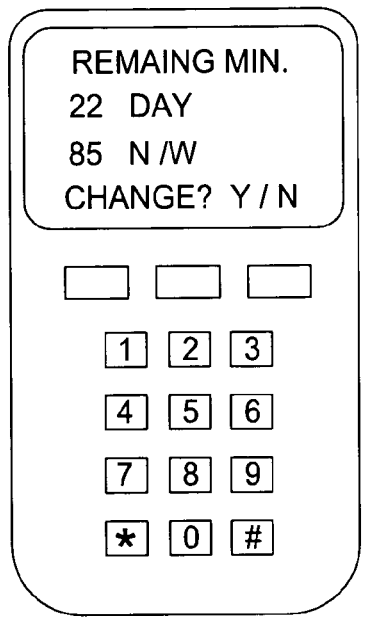
FIG. 2A
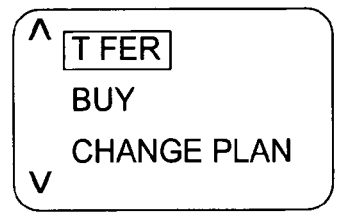
FIG. 2B
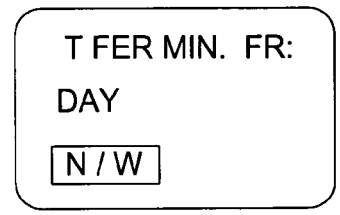
FIG. 2C
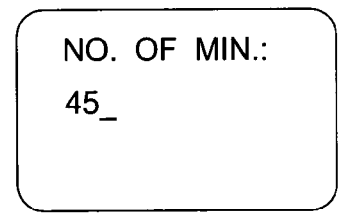
FIG. 2D
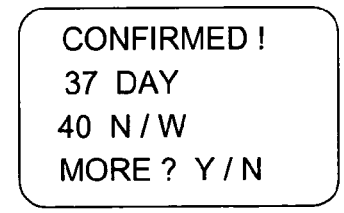
FIG. 2E
FIG. 2

INTERACTIVE COMMUNICATION SERVICE ACCOUNT MANAGEMENT SYSTEM

FIELD OF THE INVENTION

This invention relates to automated interactive management of communication service accounts including, e.g., transfer of wireless minutes from one category to another.

BACKGROUND OF THE INVENTION

Many communication services are available under a variety of pricing arrangements. Wireless telephone service is one example. Wireless telephone service is often billed on the basis of actual minutes (or portions thereof) during which the customer is using the service, but it is also common for service providers to offer multiple pricing plans that charge different rates depending on the time of usage. For example, a wireless service provider may offer a simple "pay-as-you-go" plan under which a customer is charged $0.50 per minute for "daytime" usage (perhaps between 7:00 a.m. and 7:00 p.m.) on weekdays, but is only charged $0.25 per minute for "nighttime" and weekend usage. That same service provider may also offer a plan that provides a customer with a specified amount of time the customer may use the communication service in a period without paying an additional charge. Carrying the same example forward, a service provider might offer a customer 100 daytime minutes and 100 night/weekend minutes for $39.99 per month, with any extra minutes billed at the pay-as-you-go rate. In this example, the customer has a financial incentive to subscribe in advance for a preset amount of usage time in a particular period, as the cost is less than it might otherwise be ($39.99 vs. $75.00). In addition to marketing reasons, the wireless telephone service provider may have multiple incentives to offer it customers the ability to subscribe in advance for usage in a particular period. When customers subscribe for usage in advance, the provider may thus have a more predictable revenue stream. The provider may also desire, because of system capacity constraints, to encourage use of its services during certain periods and/or discourage use during other periods.

The financial advantage to the customer may be offset, however, if all minutes are not used. Refunds are typically not provided if less than the entire allotment of minutes is actually used, and there may be limitations on carryover of minutes to the next period. A customer is less inclined to commit in advance to a specific amount of service if that customer does not believe he or she can accurately predict how much service will be needed during a given period, or when during that period that usage may actually occur (e.g., daytime vs. nighttime). In such circumstances, the customer may regard a particular communication service subscription plan as overly restrictive and inflexible. The customer thus foregoes the opportunity to benefit from reduced charges associated with the subscription plan, and the service provider suffers by having a less predictable revenue stream for that period. The service provider also loses the opportunity to encourage use of its facilities during off-peak hours or to otherwise spread the drain on system resources.

Similar arrangements and considerations exist with regard to other communication services. Long distance (wired) telephone service, for example, is often available under various pricing plans that charge different rates depending upon the time of the call, and that may include a pre-set number of calling minutes per billing period. Internet and other computer network access has also been available under varieties of pricing schemes. Moreover, new communication media and methods of communicating over existing media continue to proliferate. For example, cable systems once used primarily for television service now commonly offer broadband internet service, pay-per-view movies, and other services. The uses for cable communication will continue to expand to services such as video-on-demand; telephony (VoIP or otherwise); remote classrooms; and numerous other services employing interactive communication. As uses for cable, wireless or other communications networks expand, however, so do the drains upon network facilities. In addition to bandwidth constraints and other finite limitations on communication media, services may also be limited by available storage (memory), processing and other factors. Accordingly, communication service providers will continue to have a need to encourage service use during certain periods and discourage use during other periods. Offering customers the ability to subscribe in advance to service during a given period thus remains an attractive option.

It would therefore benefit both the customer and the communication service provider if there were a system whereby the service provider could offer one or more subscription plans for the provider's services, but at the same time allow the customer a degree of flexibility in later modifying the chosen plan. If, for example, a customer could subscribe to a quantity of service time in advance (either by actual prepayment or by contractual agreement), but at the same time be allowed to conveniently and quickly make changes to that subscription based on changes in the amount of usage time needed (or regarding the periods when that usage is needed), a customer may be more inclined to subscribe in advance to a specific amount of service. The customer could benefit by enjoying cost savings over a pay-as-you-go plan, and the service provider could benefit from a more predictable revenue stream and from retaining some ability to spread the use of system resources over off-peak periods.

To date, however, there are no known systems by which a wireless telephone service, wired telephone service, cable service, or other communication service offers a customer the ability to conveniently modify the parameters of an account during a particular account period. Continuing the wireless telephone example from above, the customer who purchased a plan providing 100 daytime and 100 night/weekend minutes per month without assessing a per minute charge may decide that she really needs 150 daytime minutes that month, and only needs 25 night/weekend minutes. In order to effect this change, and assuming a service provider was willing, current systems would require the customer to call the service provider and verbally request a change. The service provider would then have to modify the customer's account by human action. It would be advantageous if the customer could instead make changes to the account in an interactive and automated fashion by, e.g., inputting the request via keystrokes on a wireless telephone or other device, or via the Internet or other computer network. Similarly, a customer using wired long distance service may have subscribed to a plan providing X peak period minutes and Y off-peak minutes, but may later find that the actual usage during the period will be X +50 peak minutes and Y −25 off-peak minutes. Currently known systems would require the customer to call the long distance carrier and verbally request a change, with the customer's account then modified by human action. It would also be advantageous in these circumstances if the customer could instead make changes to the account in an interactive and automated fashion. The applicability of this problem to other types of communication services offering pre-paid or pre-subscribed usage levels becomes apparent, as do the advantages offered by a system allowing a customer to interactively modify a subscription in an automated manner.

SUMMARY OF THE INVENTION

The invention provides a system and method whereby a customer obtaining communication services may modify account parameters that govern the terms on which that service is provided. Customer account parameters are stored in one or more databases and accessed by one or more servers. The customer, upon accessing the communication service, is provided with an opportunity to modify the account parameters via automated interactive communication with the server. Modifications to account parameters can include: adjusting the terms of a calling or other usage plan to move prepaid usage time from one category to another; purchase more usage time; change usage plans; enable, disable or otherwise modify events scheduled to occur automatically; or to otherwise change the terms by which communication service is provided to the customer.

The invention can be applied to wireless communication services such as wireless telephone service, wireless internet access, paging, or other forms of interactive wireless communication; to telephone or other wired interactive communication; to cable services; and to any other form of interactive subscriber communications. The invention may be implemented using existing equipment, and can be optimized for the type of communication device at issue. In some embodiments, the invention also allows a customer to modify or access account parameters through a device that may be different from the device to which the account pertains. As but one example, a wireless telephone customer might wish to modify account parameters by use of a personal computer. In some embodiments, the invention contemplates a single database maintaining account information for customers using different services. For example, a telephone carrier may offer wireless service, interexchange (long distance) service, Internet access, or other services, with a variety of pricing plans and options available for all; the carrier may wish to centralize its database(s) and data management systems for these services. In such an embodiment, a customer's request to effect account changes may be routed to a centralized database and data management system, where any desired changes are made. Combinations of centralized and local databases and data management are also within the invention.

In other embodiments, the system can be programmed to automatically replenish a customer's account. Through use of the system, a customer could modify the account to disable the automated replenishment function, to reset the threshold triggering replenishment, to change payment methods, to specify a different sized block of replenishment minutes to be purchased, or to otherwise effect changes. In still other embodiments, a customer could modify an account retroactively. Yet other embodiments might permit a customer to cluster usage time across distinct access methodologies (wireless, wired, broadband, narrow band, etc) and/or move minutes from one access methodology to another.

BRIEF DESCRIPTION OF THE DRAWINGS

FIG. 2A-2E are drawings of screen displays of a wireless telephone used in connection with the present invention.

DETAILED DESCRIPTION

Figure 1:
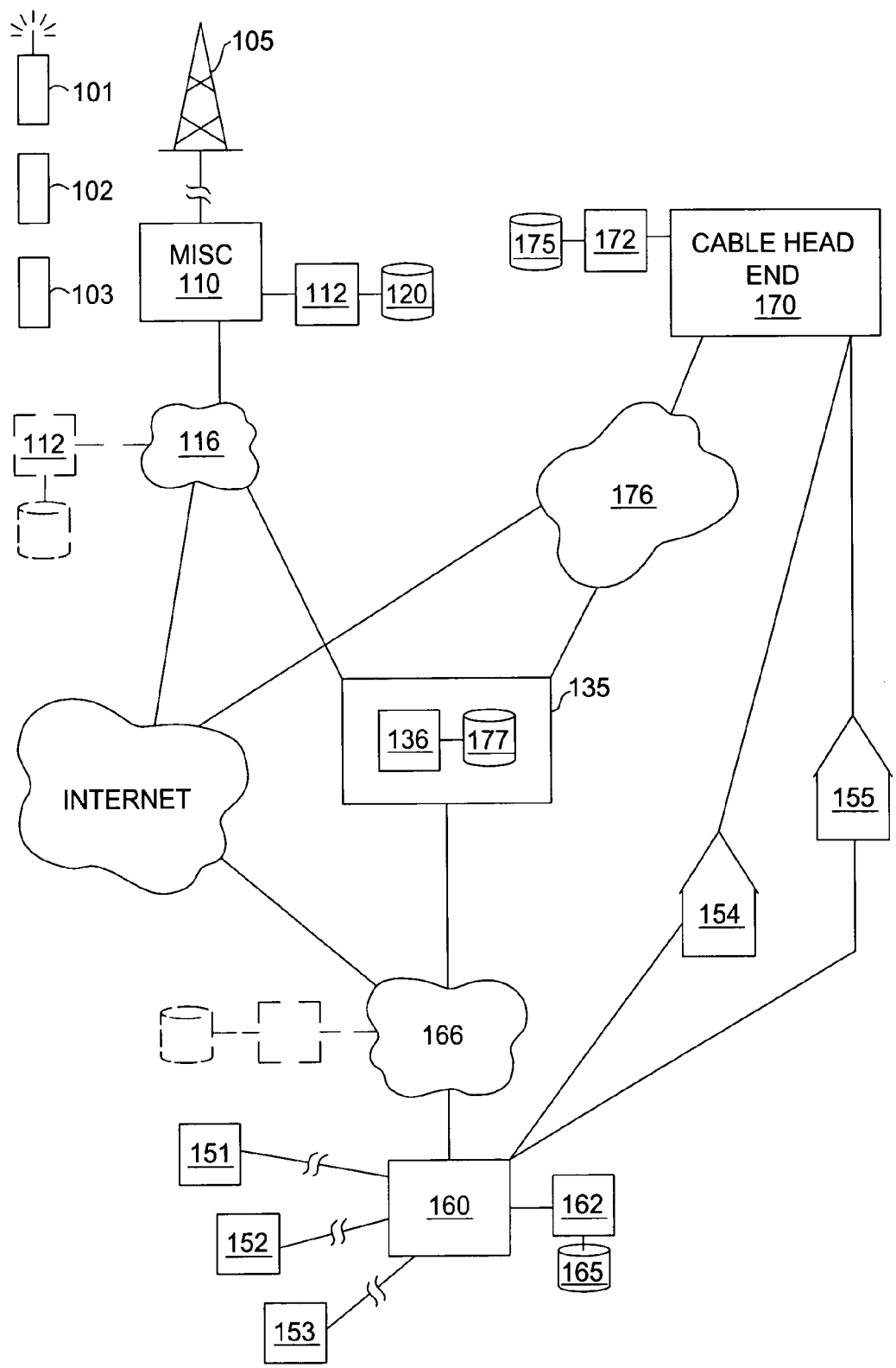
FIG. 1 is a diagram of various interconnected communications networks employing the present invention.

The invention is described with reference to the included drawings, where like-numbered features correspond to like-numbered features in the written description. FIG. 1 is a diagram of several interconnected communications networks employing the present invention. Although multiple forms of communication services are displayed in FIG. 1 and discussed herein, it is to be appreciated that the invention may also be implemented in systems offering customers less than all of the communication services exemplified herein; in systems offering other communication services not discussed herein; and in systems offering only a single form of communication service.

One form of communication service shown in FIG. 1 is wireless service, and in particular, wireless telephone service. Wireless telephones 101-103 communicate with a Mobile Switching Center (MSC) 110. Other wireless devices, including but not limited to pagers, personal digital assistants (PDAs), wireless Internet access devices, wireless web appliances, and other devices facilitating interactive wireless communications, are also within the scope of the invention, and the invention is not limited by the examples provided. The applicability of the invention to such other devices will be apparent to persons skilled in the art in light of the following described embodiments. Devices 101-103 communicate by radio frequency transmission with one or more base stations 105, which then communicates with MSC 110. To avoid unnecessary drawing detail not needed to describe the invention, all possible intermediate structures and facilities between base station 105 and MSC 110 are not shown, and are instead collectively represented by a break in the line connecting base station 105 and MSC 110. Base station 105 and MSC 110 need not be physically remote, however. Similarly, there may be multiple MSCs within a wireless service provider's region, or multiple MSCs lying within multiple service provider regions. Moreover, wireless telephones 101-103 need not be in their "home" region, and may be "roaming."

MSC 110 comprises one or more servers or other data processing facilities 112. Server 112 may alternatively be remote from MSC 110, as shown in dashed lines, communicating with MSC 110 via data communications medium such as network 116. Server 112 accesses one or more databases 120 that maintain billing, user profile and account data for all wireless devices for which MSC 110 is the home system. Although not shown in FIG. 1, database 120 may be physically remote from server 112 and accessed by means of communication network 116. Network 116 may be a signaling network or any other network allowing data communication. MSC 110 and/or databases 120 may also maintain communication links with other MSCs and databases of other service providers' systems (not shown) so as to facilitate service for devices "roaming" in the region of MSC 110, and for other purposes known in the art. MSC 110 may further be connected (via network 116, by direct connection, or by other data communication network(s)) to a centralized database and/or system management center 135; to the Internet; or to other data communication networks (not shown).

FIG. 1 also shows various wired communication services. Wired devices 151-153 communicate with a central office 160, which may be a local carrier switch or central office, an interstate carrier Point of Presence (POP), or other central facility. Central office 160 comprises one or more servers or other data processing means 162. Server 162 could alternatively be remote from central office 160, as shown in dashed lines, communicating with central office 160 via data communication medium such as network 166. Network 166 may be a signaling network or any other network allowing data communication. In the example of FIG. 1, device 151 is a telephone; device 152 is a computer; and device 153 is a videophone. Other devices allowing interactive communication service are also within the scope of the invention, including web telephones, web appliances, smart phones, etc., and the invention is not limited by the examples provided. Wired devices 151-153 may communicate via POTS, DSL loop, fiber optics, cable or other means. The applicability of the invention to multiple types of wired communication devices will be apparent to persons skilled in the art in light of the below-described embodiments. To avoid unnecessary drawing detail not needed to describe the invention, intermediate structures and facilities between devices 151-153 and central office 160 are not shown, but persons skilled in the art will appreciate that various other switches, routers, gateways, bridges and other facilities may lie between devices 151-153 and central office 160. Server 162 accesses one or more databases 165 that maintain billing, user profile and account information regarding devices 151-153. Although not shown, database 165 may be physically remote from server 162 and accessed via network 166 or via other data communication network. Central office 160 may further be connected (via network 166, by direct communication, or by other data communication network(s)) to a centralized database and/or system management center 135; to the Internet; or to other data communication networks (not shown).

FIG. 1 further shows cable head end 170. Cable head end 170 communicates by cable connection with subscribers such as 154 and 155. Subscribers 154 and 155 may, but need not, also be connected to a central office such as central office 160. Cable head end 170 may provide subscribers 154 and 155 with cable television services, with cable audio services, broadband computer network access, video-on-demand, telephone service (VoIP or otherwise), or other services. As but one additional example, interactive remote classrooms could be established, with students interactively communicating with an instructor over a cable connection. A subscriber such as 155 may interactively communicate with head end 170 by way of a set top box with advanced features allowing two way message exchange, by interactive television set, by connection to a "smart jack," or by other intelligent and/or interactive communication device. To avoid unnecessary drawing detail not needed to describe the invention, intermediate structures and facilities between subscribers 154 and 155 and head end 170 are not shown, but persons skilled in the art will appreciate that various other structures and facilities may lie between subscribers 154 and 155 and head end 170. For example, there may be intermediate distribution and/or concentration points between subscribers and a cable head end. Certain customers may also have multiple devices in a home network, and thus have routers, hubs or other facilities within the home. Head end 170 is further connected to a server or other data processing facility 172. Although not shown, server 172 could be remote from head end 170 and in communication via one or more data communication networks. Server 172 accesses one or more databases 175 that maintain billing and account information for subscribers 154 and 155. Cable head end 170 could communicate via a network such as network 176, which could be any type of data communication network. Server 172 and database 175 may further be connected to a centralized database and/or system management center 135; to the Internet; or to other data communication networks (not shown).

In one embodiment, wireless devices 101-103 are wireless telephones, and MSC 110 and server 112 are operated by a wireless telephone service provider offering wireless telephone service in the region in which MSC 110 is located. That region is, in the example of FIG. 1, the home region of telephones 101-103. The wireless telephone service provider may offer a variety of rate plans, such as those set forth in Table 1.

TABLE 1

| Plan | Cost/Mo. | Day | Night/Wkend Extra |
|---|---|---|---|
| 1 | $15.99 | — | $.50/minute (day); $.25/minute (n/w) |
| 2 | $29.99 50 min. | 50 min. | $.50/minute (day); $.25/minute (n/w) |
| 3 | $39.99 100 min. | 100 min. | $.50/minute (day); $.25/minute (n/w) |
| 4 | $59.99 500 min. | Unlimited | $.50/minute (day) |

Plan 1 is a "pay-as-you-go" plan under which a customer pays, in addition to a base monthly charge of $15.99, one rate for daytime minutes and another for night and weekend minutes regardless of the customer's monthly usage. Plan 2 offers the customer a slight discount, and provides the customer with up to 50 minutes of daytime usage per month and 50 minutes of night/weekend usage per month for a monthly base charge of $29.99. If the customer's usage exceeds the minutes allocated under the plan, the customer pays at the "extra" minutes rate for usage above the allocation. Conversely, if the customer uses less than 50 daytime minutes or less than 50 night/weekend minutes during the monthly billing period, the customer does not receive a refund. Plan 3 is similar to plan 2, but offers a greater discount. Plan 4 is slightly different, offering an unlimited number of night/weekend minutes, but charging a higher rate for extra daytime minutes beyond the monthly allocation. It is to be understood that the plans listed in Table 1 have been generated as examples to explain the operation of the invention, and the invention is in no way limited to (or by) these examples. Persons skilled in the art will appreciate that an almost infinite variety of plans are possible.

Continuing the example, a customer owning wireless telephone 101 has subscribed to plan 3. At some point during the month, the customer realizes she will not need 100 night/weekend minutes, but will need more than 100 daytime minutes. Unless she can modify her subscription agreement with the wireless service provider, she will pay the extra minute rate for excess daytime minutes, and will lose any night/weekend minutes she does not use. However, the wireless service provider offers its customers a service by which they can modify certain aspects of their accounts during a billing period. This could include the option to exchange night/weekend minutes for daytime minutes, or vice versa. By way of example, the wireless service provider may allow customers to exchange day and night minutes based on the same ratio as the cost of day and night minutes under a pay-as-you-go plan (2:1 in this example). As another alternative, the wireless service provider may charge a slight premium for the exchange. In this example, the wireless service provider offers its plan 3 subscribers the ability to exchange up to 60 night/weekend minutes per month for 20 daytime minutes (3:1). Service providers could allow exchange of minutes on multiple bases, all of which are within the scope of the invention.

When the customer activates telephone 101, telephone 101 registers with its serving base station and MSC 110 and identifies itself to MSC 110. Server 112 queries one or more databases 120 to determine whether telephone 101 is a subscriber to the wireless service provider's account modification service. If so, server 112 further determines the plan(s) to which telephone 101 subscribes; the number of day and night/weekend minutes remaining for the month; payment status; and any other necessary information. Server 112 then transmits to telephone 101 a data message comprising the number of unused day minutes and night/weekend minutes remaining in the customer's account for that billing period (generally, that month). These minutes are then displayed on the screen of telephone 101, as shown in FIG. 2A. In this example, telephone 101 has 22 daytime minutes left and 85 night/weekend minutes left for the month. Using telephone 101, the customer then exchanges 45 night/weekend minutes for 15 daytime minutes by entering keystrokes on telephone 101, and without need to speak with a human operator. In this example, the customer first presses a button corresponding to "yes," indicating a desire to make account changes. This is transmitted to server 112. Server 112 then causes telephone 101 to show the display shown in FIG. 2B, prompting the customer to choose the type of account changes to make. The arrows indicate the customer can scroll the display to show other choices. The customer highlights and selects "transfer," thereby signaling a desire to transfer minutes from one category to another. This choice is transmitted to server 112. Server 112 then verifies that this type of transfer is possible for this customer's account, and then causes telephone 101 to show the display shown in FIG. 2C, prompting to the customer to choose which type of minutes will be transferred. Although only two types are shown (day and "N/W" for night/weekend), additional categories are possible. The customer highlights and selects "N/W" to exchange night/weekend minutes for daytime minutes. This choice is transmitted to server 112. After verifying this is a valid choice, server 112 causes telephone 101 to show the display of FIG. 2D. This display asks the customer to input the number of minutes to be transferred. The customer does so and presses a key corresponding to "enter." This is transmitted to server 112, which verifies this is valid (i.e., that the customer is not trying to transfer minutes she does not have), and if valid, updates the customer's user profile and account information in one or more databases 120, and causes telephone 101 to show the screen of FIG. 2E, confirming the transaction and offering the customer the ability to make further account modifications. The customer chooses "no," and is then able to make a call or perform another function with telephone 101.

The particular keys, sequence of keystrokes, messages and prompts can vary based on the particular equipment used and based on other criteria. Persons skilled in the art will recognize numerous other possible variations on the above, all of which are within the scope of the invention. For example, the computational steps and/or database manipulation necessary to effect an account modification may occur at a server or other data processing facility that is part of an MSC; may be an adjunct to other MSC equipment; or may occur at a remote location. Server 112 may be a separate device configured to process account modifications, or may represent additional functions performed by a server or other data processing device that performs other functions for MSC 110 and/or the wireless network of which MSC 110 is a part. As but one example, an existing accounting or billing server might be configured to perform the additional functions described above for server 112. Similarly, database 120 could be a separate data storage facility, a separate database on an existing storage facility, or additional data records of an existing database. As another example, telephone 101 may be roaming outside of its home region when the customer elects to modify the account. If the customer's account information, user profile and other information are maintained by the home system (as would typically be the case), the wireless provider in whose region telephone 101 is roaming would communicate with MSC 110, by methods and systems known in the art, and modifications to the account of telephone 101 effected. As another variation, a telephone or wireless device may have resident software that minimizes the amount of radio message traffic between the device and the MSC. For example, the device could be configured to collect information from the user about the type of transaction desired and transmit that data at once, instead of in the manner reflected in FIGS. 2A-2E and the discussion above. In other embodiments, the invention may incorporate security features to prevent unauthorized persons from accessing information about the account for telephone 101 or from modifying that account. Security could be based upon telephone device numbers, upon secondary passwords, upon voice identification, or upon other systems.

Figure 3:
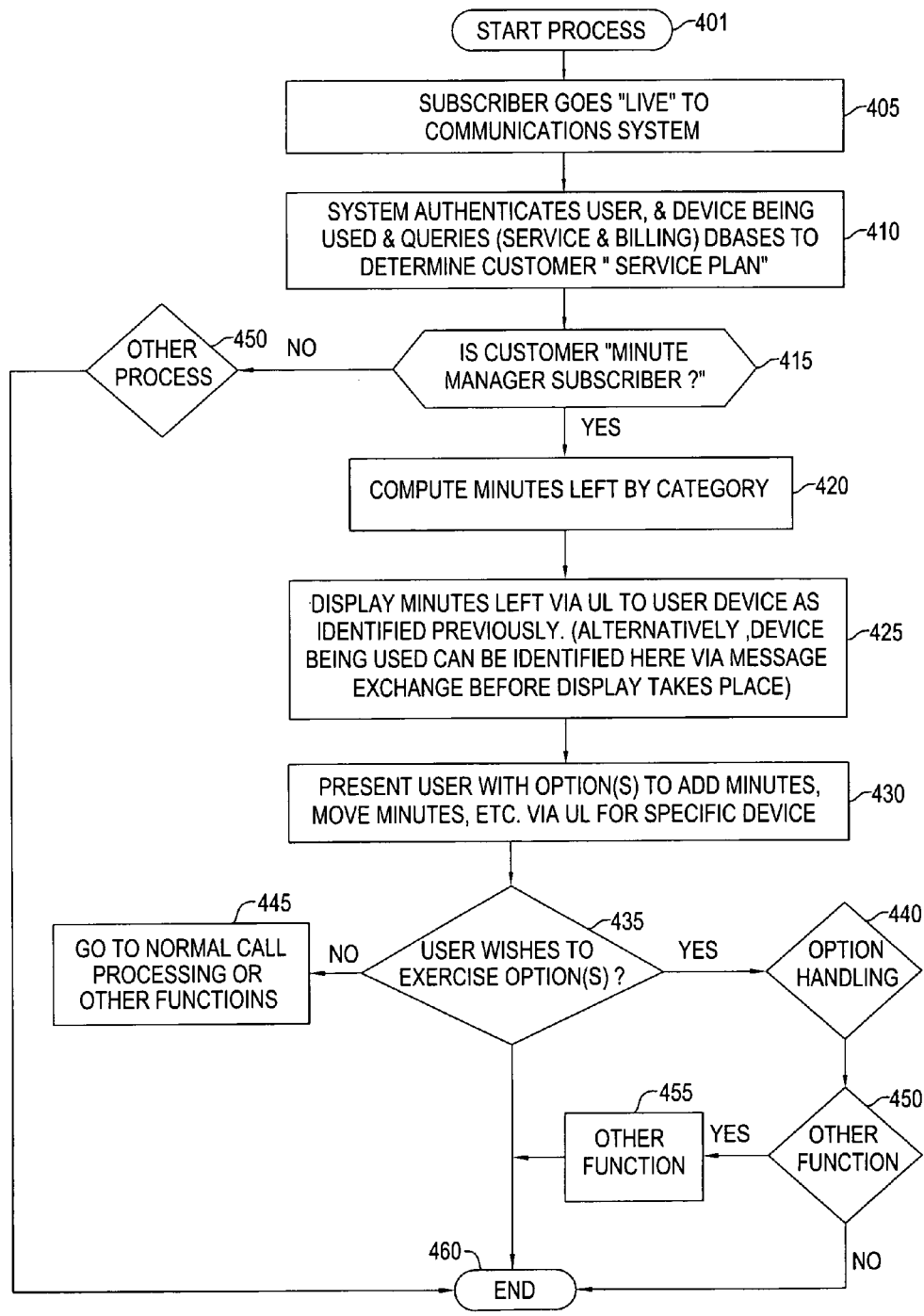
FIG. 3 is a flow chart showing operation of one embodiment of the invention.

FIG. 3 is a flow chart showing operation of one embodiment of the invention in the context of wireless service, but which is readily adaptable to other communications services. At step 401, the customer's communication device is activated. At step 405, the device "goes live" and identifies itself to the communication system. In the case of wireless telephone 101, the telephone identifies itself to MSC 110. At step 410, the system authenticates the customer's device as a valid device and queries one or more databases to determine the customer's service plan. At step 415, the system determines whether the account associated with the device includes the account modification service. If not, the system proceeds to step 450 and allows the device to access other services (for example, placing calls). If the account does include account modification service, at step 420 the system proceeds to compute minutes left by category (e.g., day, night/weekend). The system then transmits that data to the device at step 425, where the information is displayed or otherwise provided to the user. At step 430, the user is then given the option to add minutes, to move minutes into a different category, or to otherwise make account changes. At step 435, the customer indicates whether changes will be made, and if no changes are desired, the customer is then permitted at step 445 to perform other services. If changes are desired, they are made at step 440. The customer is then given the option to perform other services (e.g., make a call) at step 455. The process ends at step 460.

A wireless telephone service provider may also offer a customer numerous other account modification options. For example, a service provider may exchange daytime minutes for night/weekend minutes. This could occur at whatever exchange rate a provider chooses, and may encourage a customer to move their minutes to lower usage periods (e.g., offer to exchange 1 daytime minute for 5 night/weekend minutes). A service provider might allow a customer to change plans without speaking to an operator (e.g., go from plan 3 to plan 2 or plan 4). A service provider could also allow a customer to purchase another "block" of usage time. For example, instead of exchanging night/weekend minutes for daytime minutes, the wireless service provider could permit the customer to purchase a block of 100 more daytime minutes at a discounted rate. If the customer does not use all of the 100 additional minutes in the block, she receives no refund, but the minutes in the block are less expensive than minutes under the "extra minutes" rate.

The invention can be implemented on existing hardware with software modifications. For example, time and amount (minutes) of usage and other call data for wireless telephone service can be captured from existing systems already in place for roaming, billing and other functions. The invention is not limited by where functions of the invention are carried out. In the context of wireless web (or other Internet) access, for example, necessary processing and data storage could occur at the MSC serving the device, through the web at a remote web-based server, or at any other location within data communication.

The invention is similarly not limited to wireless communication services, and is applicable to wired devices such as telephones, computers, or other devices capable of transmitting and receiving the necessary data. In FIG. 1, devices 151-153 communicate with central office 160, which in turn communicates with one or more databases 165. When a customer owning telephone 151, for example, wishes to modify an account (for example, to change or modify a long distance calling plan), the customer may call a specific number. Telephone 151 is then connected, perhaps via intervening facilities not shown, to central office 160. Telephone 151 is then connected to server 162, which sends an automated voice message indicating how many unused minutes remain in the billing period. The message also gives the customer the opportunity (by, e.g., pressing a particular code or other key sequence) to modify the account. If the customer chooses to do so, the server 162 sends a series of automated voice prompts that elicit the necessary information from the customer. Server 162 then modifies the customer's account information on one or more databases 165. As is the case with regard to wireless services, the invention can be implemented on existing hardware by making software modifications. Call and account data can be captured from, e.g., existing systems already in place, such as a switch, an existing billing server, or other known sources. Again, the invention is not limited by where functions of the invention are carried out. For example, necessary processing and data storage could occur at a switch, at a server or other adjunct to a switch, at a remote server, or at any other location within data communication.

Devices 151-153 could be devices other than conventional voice telephones, including but not limited to computers; PDAs, videophones, web-based appliances, etc. Depending upon the device, the customer may receive automated prompts by screen display. Indeed, in all customer devices according to the invention (whether wired, wireless or cable), data is displayed on the subscriber's device in a format best representable by the device. Each customer account can have, as part of its user profile, information regarding the customer device(s) and how data is to be displayed. Depending on the device, the information might be presented as an SMS message, voice message, live voice (if human operator assistance is required because, e.g., language issues), simple text field presentation, graphical display, IVR (interactive voice response) exchange, etc. Device specification could also occur through the device itself, including device self-identification and/or optimization of service based on device-specific parameters. If a web-enabled device is involved, information could be provided via a specific port (UDP or TCP), and can be brought to the subscriber's attention using Instant Messaging, Hosted Web Page, email message (periodic or otherwise), etc.

As described with regard to wireless telephone service, the system could advise a customer, upon device activation, of the remaining time left under the customer's subscription plan. In the case of a computer, a video phone, or other device with a display screen or other visual display, the device could, upon activation, booting or otherwise, show a breakdown of usage remaining under various categories of a customer's subscription. A customer could establish, by initial account setup or by subsequent interactive account modification, whether the customer wished to receive this initial notification. In the case of a telephone without a visual display or other device without visual display, an audio announcement (prerecorded or generated by automated means known in the art) could be provided whenever the customer calls the account modification number as discussed above. Alternatively, the customer could elect to receive this message upon dialing an access code for a long distance carrier (i.e., 10-10-_), or perhaps even upon dialing "1."

FIG. 1 further shows an example of the invention in the context of a cable system. Cable head end 170 communicates with customers such as 154 and 155. Cable head end communicates with server 172, which accesses one or more databases 175. Customers 154 and 155 may subscribe to conventional cable television services; to broadband Internet access service provided by the operator of cable head end 170; to VoIP telephony; to video-on-demand service; or to other services provided by (or through) the cable operator. Customers 154 and 155 may access these services through multiple devices, including computers, smart television sets, cable set-top boxes, or other devices capable of interactive communication. As with wireless and other forms of wired communication, the cable operator may offer customers 154 and 155 various pricing plans that encourage use of services during certain times or discourage use during other times. As but one example, a customer may be able to remotely take a class that is offered via the cable system. Although customers may prefer to take classes in the evening, it may be difficult to find teachers willing to instruct at that time, or who charge more to do so. Accordingly, customers may be able to take the class for one price during the day and another price at night, with the ability to change times at a corresponding premium (or credit). As another example, a cable operator may offer video-on-demand service allowing customers to choose from numerous movies and watch the movie at any desired time. However, the cable operator may have limits upon the number of customers that can access its video storage facilities at one time. The operator might therefore offer "packages" of movies with varying prices based on when the service is accessed. A customer could, for example, have a plan allowing 5 "matinee" movies and 5 evening movies a month. The operator could then allow the customer to modify the plan at a premium (e.g., 2 matinees for one evening movie), or on some other basis. In the case of VoIP, the operator may offer calling plans similar to those offered with regard to wireless and conventional telephone service, and the ability to modify those plans.

When a customer desires to modify a subscription in some manner, the customer communicates with cable head end 170 and server 172, which then modifies the customer's account status in one or more databases 175. The customer's device (whether a computer, a television and set top box, etc.) can then display account information to the customer on start-up, in a device appropriate manner similar to the previously-described examples. The system might allow, for example, a cable operator to allow "specials" whereby a customer can purchase credits for pay-per-view movies or other services in advance, and then use those credits at some future date. When the customer first turns on a television, a set-top box could display the amount of such credits available, offer the customer an opportunity to purchase more, etc.

The invention also allows a customer to modify or access account parameters through a device that may be different from the device to which the account pertains. Referring again to the example of wireless telephone 101, the customer might wish to modify account parameters by use of a personal computer. By using a computer, such as a computer located at 154 in FIG. 1, the customer accesses server 112 by one or more computer networks. For example, the wireless service provider could maintain a web site on the Internet. In one embodiment, server 112 could be connected, either directly or through network 116 or other communication networks, to the Internet. The customer logs into the web site, which may be secured by password or other means, and effects any desired account changes.

The invention could also utilize a single database maintaining account information for customers using different services. For example, a telephone carrier may offer wireless service, interexchange (long distance) service, Internet access, or other services, with a variety of pricing plans and options available for all. The carrier may wish to centralize its database(s) and data management systems for these services. FIG. 1 shows a centralized database and data management system 135, which further comprises server 136 and database 137. In this embodiment, a customer's request to effect account changes may be routed to centralized database and data management system 135, where any desired changes are made by server 136 to database 137. Combinations of centralized and local databases and data management are within the invention. For example, a carrier may maintain user profiles and account data for wireless service on local database 120, but maintain other account information on centralized database 137.

In another embodiment, the system can be programmed to automatically replenish a customer's account. For example, a wireless telephone customer may have a subscription plan whereby the customer has 100 daytime minutes per month for a flat fee, with automatic replenishment of those minutes once the 100 minutes are used, or when the customer's balance of remaining usage time reaches a predetermined level. The system could then be programmed to automatically provide another block of 100 minutes at a predetermined cost. A designated bank account, phone card, credit card, debit card, or other source of funds could be automatically debited. Through use of the system, a customer could modify the account to disable the automated replenishment function, to reset the threshold triggering replenishment, to change payment methods, to specify a different sized block of replenishment minutes to be purchased, or to otherwise effect changes.

In another embodiment, a customer could modify an account retroactively. If a wireless customer exceeded the monthly usage minutes, the customer could simply buy another block of minutes to cover the excess minutes used. In addition to providing a customer with further flexibility when choosing a subscription plan, this feature would provide a communication service provider with an important marketing advantage.

Yet another embodiment might permit a customer to cluster minutes across distinct access methodologies (wireless, wired, broadband, narrow band, etc). Additionally, a customer might move minutes from one access methodology to another. For example a customer may have 50 wired day minutes and 3 wireless day minutes, and might want to convert some wired day minutes to wireless day minutes. Conversions could be done either automatically (where an algorithm provides the user with the best conversion rate) or by subscriber request. The system could also provide the ability to combine multiple members of a household or "circle" in which minutes can be shared between the members of the circle. Hence the minutes are pooled and everyone in the circle has access to them and the ability to convert them. This conversion ability can be accounted for via a profile for the group administered by a group member. Limitations can be put in place by the group administrator to limit activities of group members.

For convenience, the description has used certain communication services as examples of embodiments of the invention. Numerous other examples and combinations are within the scope of the invention. For example, a communications network may have both wired and wireless components. Persons skilled in the art will appreciate that the invention can be implemented in any communication service environment wherein a customer might advantageously modify an account through automated interactive means. Moreover, costs, calling plan terms, and other exemplary parameters used herein are merely provided to describe the operation of the invention in sufficient detail so as to permit its practice by persons skilled in the art, but are not limitations on the invention. Instead, the invention is defined by the attached claims, which are to be construed as broadly as possible in light of the specification and the prior art.

We claim:

1. A system for automated interactive management of a communication service account, said account having parameters establishing rules of use, comprising:

a server; and a data storage device in communication with the server, the data storage device comprising account data that comprises the parameters establishing rules of use of at least one subscribed communication service, where said at least one subscribed communication service is accessible by a user device, wherein the server is configured to receive a customer-initiated signal requesting modification of a first account parameter and a second account parameter from said parameters and to modify the first account parameter and the second account parameter in response to the customer-initiated signal, wherein the server is further configured to update the first account parameter based upon use of the at least one subscribed communication service by the user device, and the server is further configured to, upon the first account parameter reaching a first predetermined value, automatically reset the first account parameter to a second predetermined value, wherein the first account parameter is a number of calling plan minutes allocated for a first time period, the second account parameter is a number of calling plan minutes allocated for a second time period, the server is configured to update the number of calling plan minutes allocated for all time periods based upon the user device placing a plurality of wireless telephone calls, the first predetermined value is a minimum calling plan minute threshold, and the second predetermined value is larger than the first predetermined value.

2. The system of claim 1 wherein the at least one subscribed communication service is a wireless telephone service, the user device is a wireless telephone, the customer-initiated signal is initiated on the user device.

3. The system of claim 1 wherein the at least one subscribed communication service is a wireless telephone service, the user device is a wireless telephone, the customer-initiated signal is initiated on a device that is not the user device.

4. The system of claim 3 wherein the customer-initiated signal is initiated on a personal computer.

5. The system of claim 1 wherein the at least one subscribed communication service is a long distance telephone service, the user device is a telephone, the customer-initiated signal is initiated on the user device.

6. The system of claim 1 wherein the at least one subscribed communication service is a long distance telephone service, the user device is a telephone, the customer-initiated signal is initiated on a device that is not the user device.

7. The system of claim 6 wherein the customer-initiated signal is initiated on a personal computer.

8. The system of claim 1 wherein the at least one subscribed communication service shares a communication medium with a cable television transmission and the user device is one of a personal computer, a set top box, an interactive television, and a Voice over Internet Protocol (VoIP) telephone.

9. The system of claim 1 wherein the server is further configured to receive a customer-initiated identifying signal identifying the user device, to retrieve the first account parameter in response to the identifying signal, and to issue, in response to the identifying signal and for communication to the customer, a response signal comprising at least part of the first account parameter.

10. The system of claim 9 wherein the server is further configured to identify a type of user device, and to issue the response signal in a form optimized for the user device.

11. The system of claim 10 wherein the at least one subscribed communication service is a wireless telephone service, the user device is a wireless telephone, the customer-initiated signal is initiated on the user device.

12. The system of claim 10 wherein the at least one subscribed communication service is a long distance telephone service, the user device is a telephone.

13. The system of claim 10 wherein the at least one subscribed communication service shares a communication medium with a cable television transmission and the user device is one of a personal computer, a set top box, an interactive television, and a Voice over Internet Protocol (VoIP) telephone.

14. The system of claim 1 wherein the server is further configured, upon receipt of a customer-initiated cancellation signal, to not automatically reset the first account parameter to said second predetermined value.

* * * * *